United States Patent [19]

Leigh-Monstevens et al.

[11] Patent Number: 4,915,202

[45] Date of Patent: Apr. 10, 1990

[54] CONCENTRICALLY MOUNTED HYDRAULIC CLUTCH ACTUATOR

[75] Inventors: Keith V. Leigh-Monstevens, Troy; Paul M. Regula, Sterling Heights, both of Mich.

[73] Assignee: Automotive Products plc, Warwickshire, England

[21] Appl. No.: 257,064

[22] Filed: Oct. 13, 1988

Related U.S. Application Data

[63] Continuation-in-part of Ser. No. 153,512, Feb. 18, 1988, which is a continuation of Ser. No. 921,762, Oct. 22, 1986, abandoned.

[51] Int. Cl.$^4$ .................... F16D 25/08; F16D 13/58
[52] U.S. Cl. .................... 192/85 CA; 192/88 A; 192/110 B; 92/169.2
[58] Field of Search ............. 192/85 CA, 70.13, 88 A, 192/91 A, 98, 110 B; 92/169.1, 169.2, 170.1, 248

[56] References Cited

U.S. PATENT DOCUMENTS

| | | | |
|---|---|---|---|
| 4,585,109 | 4/1986 | Shirley et al. | 192/85 CA |
| 4,601,374 | 7/1986 | Ladin | 192/85 CA |
| 4,609,087 | 9/1986 | Shirley | 192/85 CA |
| 4637,505 | 7/1987 | Huber | 192/85 CA |
| 4,660,702 | 4/1987 | Flotow | 192/85 CA |
| 4,684,003 | 8/1987 | Leigh-Monstevens | 192/85 CA |
| 4,708,228 | 11/1987 | Leigh-Monstevens | 192/85 CA |

FOREIGN PATENT DOCUMENTS 0252701 1/1988 European Pat. Off. .

*Primary Examiner*—Rodney H. Bonck
*Assistant Examiner*—Andrea Pitts
*Attorney, Agent, or Firm*—Krass and Young

[57] ABSTRACT

A hydraulic clutch actuator for a motor vehicle of the concentric type in which the actuator is mounted concentrically around the transmission input shaft of the vehicle within the housing of the clutch. The actuator includes a housing structure defining a central quill shaft surrounding the input shaft of the vehicle and slidably supporting the hub portion of the bearing carrier and further defines an annular piston bore spaced radially outwardly from the quill shaft to define an annular bore between the piston bore and the quill shaft into which the rear end of the hub portion of the bearing carrier may move during the operation of the actuator so as to provide overlap as between the annular piston and the bearing carrier and minimize the axial dimension of the actuator. The preload spring is also positioned in the annular bore between the quill shaft and the piston bore so as to further optimize the compact packaging of the actuator. The actuator housing structure is formed of a plastic material and the actuator further includes a strengthening steel ring or hoop that is insert molded around the housing structure adjacent the open, forward end of the piston bore and a dust shield that is lockingly mounted at its rear end on the strengthening ring and sealingly engages the piston at its forward end.

11 Claims, 2 Drawing Sheets

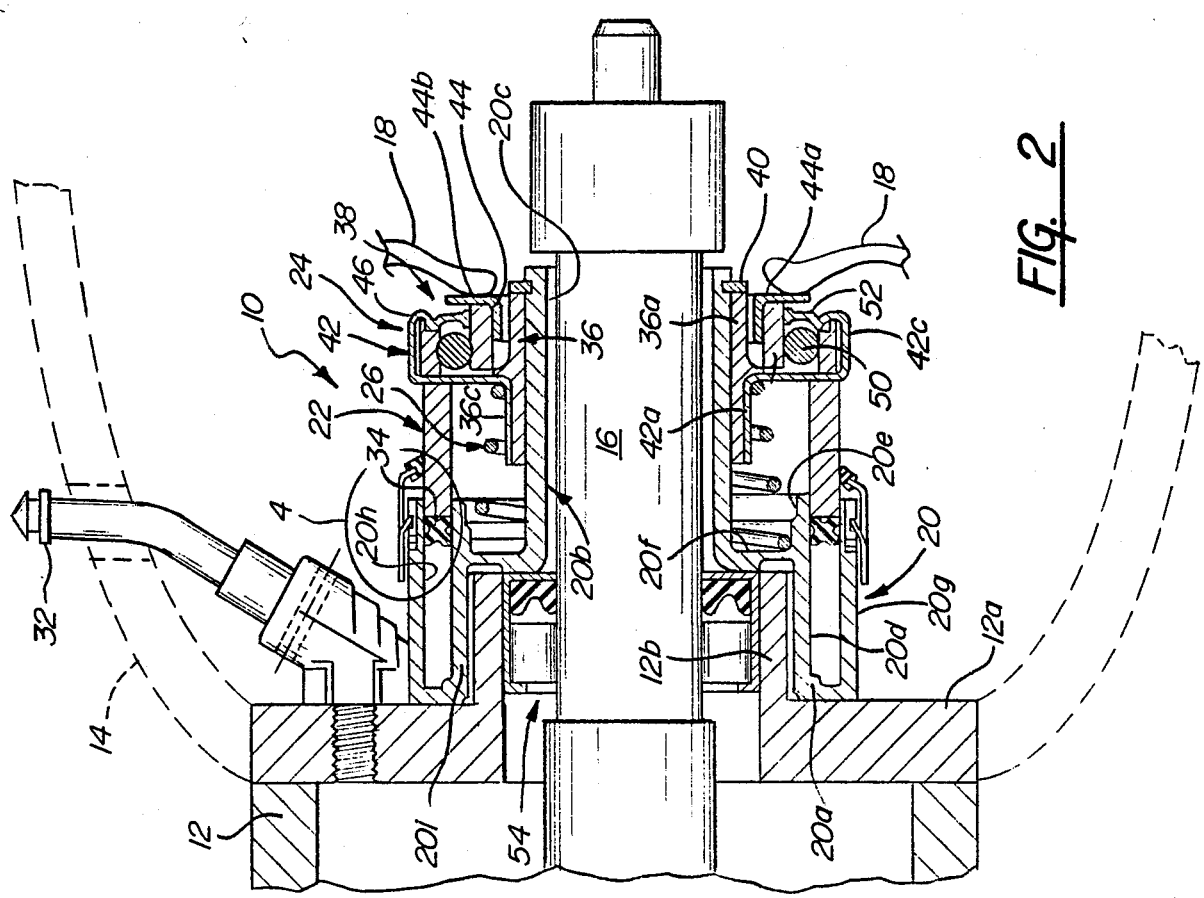

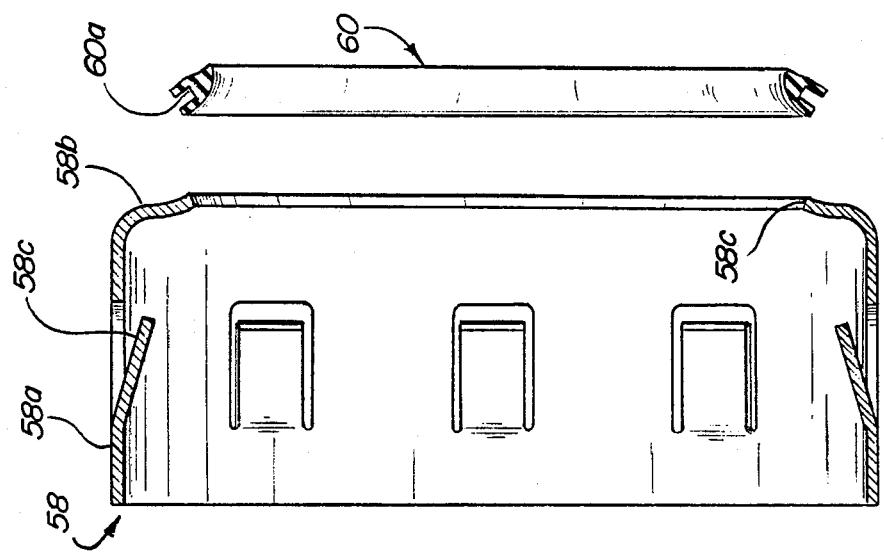
FIG. 7
FIG. 6
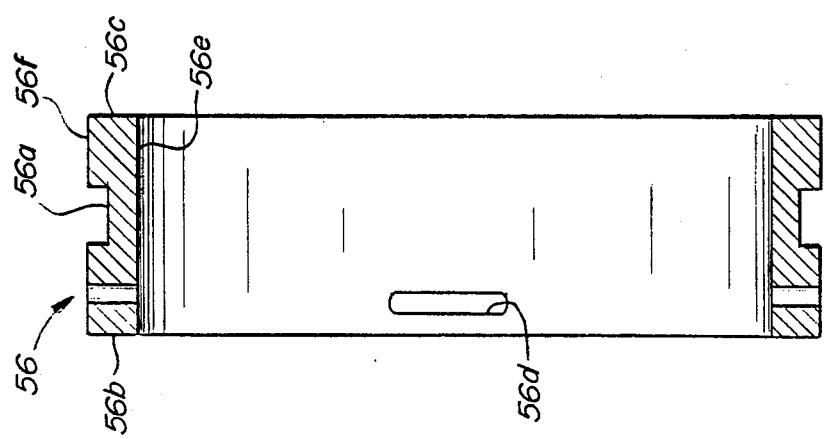
FIG. 5
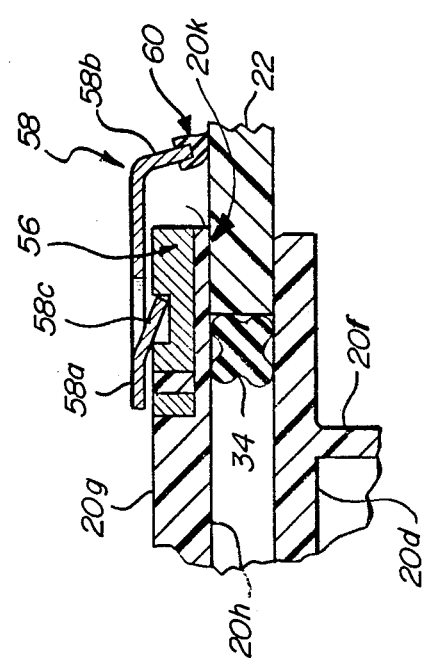
FIG. 4

CONCENTRICALLY MOUNTED HYDRAULIC CLUTCH ACTUATOR

REFERENCE TO RELATED APPLICATION

This application is a continuation-in-part of U.S. patent application Ser. No. 153,512 filed on Feb. 18, 1988 which is a continuation of U.S. patent application Ser. No. 921,762 filed on Oct. 22, 1986, now abandoned.

FIELD OF THE INVENTION

This invention relates to hydraulic clutch actuators for use with motor vehicles having manual transmissions. More specifically, this application relates to a hydraulic clutch actuator in the form of a concentric slave cylinder which is intended for mounting within the clutch housing in concentric surrounding relation to the transmission input shaft interconnecting the clutch and the transmission of the vehicle.

BACKGROUND OF THE INVENTION

The clutch actuator for manual transmission motor vehicles comprises a selectively displaceable element which is connected to the release member of the clutch assembly to separate two rotatable elements of the clutch, which elements are normally frictionally coupled to transfer energy from the engine crank shaft to the transmission input shaft. In the case of a hydraulic actuator, the actuator comprises the slave portion of a hydraulic master cylinder/slave cylinder assembly wherein the master cylinder is mounted so as to be directly operated by the clutch pedal.

As is well known, the release element of the clutch rotates at engine speed when the clutch is engaged and slows down and may eventually stop when the clutch is released or disengaged to permit a gear change. The actuator, on the other hand, is nonrotating. That is, the body of the actuator must be secured against rotation to a structural component such as the transmission housing of the clutch housing. Therefore, the clutch actuator must be connected to the release member through a bearing, commonly called a throw-out or release bearing.

The actuator can be an external slave unit mounted off axis relative to the transmission input shaft or it can be a concentric slave cylinder mounted concentrically with respect to the transmission input shaft. The off axis arrangement involves a lever arm connected between the actuator output element and the clutch release member. The typical concentric arrangement requires no such lever arm. Instead, the cylinder body of the actuator is fixed to the clutch bell housing or to the face of the transmission housing and the axially translatable piston is connected to the outer race of the throw-out bearing. The inner race is in turn connected to the clutch release element.

Examples of concentric clutch actuators are shown for example in U.S. Pat. Nos. 4,585,106 or 4,585,107; 4,585,108; 4,585,109; 4,609,087; 4,264,290; 4,660,694; 4,684,003; 4,687,084 and 4,708,228, all assigned to the assignee of the present application.

Whereas the concentric slave cylinders disclosed in the above-identified U.S. patents are generally satisfactory, there are certain structural aspects of the prior art concentric slave cylinders that render them susceptible to structural failure.

SUMMARY OF THE INVENTION

This invention is directed to the provision of an improved concentric slave cylinder for use with a clutch of a manual transmission motor vehicle.

More specifically, this invention is directed to the provision of a concentric slave cylinder for a manual clutch which is especially resistant to structural failure.

The invention hydraulic actuator is intended for use with a clutch of the type including a transmission input shaft for connection to a transmission and having an axis of rotation, and a clutch release element which is displaceable along the rotational axis of the transmission input shaft.

According to the invention, the hydraulic actuator includes a housing structure formed of a plastic material and adapted to be positioned within the clutch housing in concentrically surrounding relation to the drive shaft; the housing includes inner and outer axially extending annular wall portions forming an annular axially extending blind piston bore having an open end and a closed end; an annular piston is positioned at one end in the piston bore and extends at its other end out of the piston bore; and a metal ring is positioned in tightly surrounding relation to the outer annular wall portion of the plastic housing. This arrangement provides an inexpensive and yet effective means of structurally reinforcing the plastic housing so as to delimit radially outward expansionary movement of the annular outer wall of the housing in response to hydraulic fluid pressure generated within the bore of the housing in the use of the apparatus.

According to a further feature of the invention, the ring is insert molded into the outer periphery of the outer annular wall portion. This specific arrangement allows the composite housing structure to be formed in an inexpensive and relatively simple insert molding process using available insert molding technology.

According to a further feature of the invention, the ring is positioned around the outer annular wall portion of the housing adjacent the open end of the piston bore. This specific positioning of the ring places the strengthening behavior of the ring at the location on the outer annular wall most susceptible to radial outward expansion.

According to a further feature of the invention, the actuator further includes an annular dust shield secured proximate one axial end thereof to the outer annular wall of the housing and sealingly engaging at its other end with the piston.

According to a further feature of the invention, the ring includes a radially outwardly opening groove extending circumferentially around the outer periphery of the ring and the dust shield includes an axially extending main body portion including circumferentially spaced prong portions received in the groove. This specific structure of the dust shield in coaction with the specific structure of the ring allows the dust shield to be mounted over the outer periphery of the outer wall of the housing with a simple snapping movement.

According to a further feature of the invention, the dust shield further includes a radially inwardly extending lip portion adjacent the other end thereof and the apparatus further includes an annular elastomeric member secured to the free annular edge of the lip portion and sealingly engaging the piston. This specific arrangement allows the dust shield to effectively seal the piston bore.

BRIEF DESCRIPTION OF THE DRAWINGS

FIG. 1 is an end view of a hydraulic actuator according to the invention;

FIG. 2 is a cross sectional view taken on line 2—2 of FIG. 1;

FIG. 3 is a schematic view of a prefilled assesmbly including the invention actuator;

FIG. 4 is a detailed view within the circle 4 of FIG. 2;

FIG. 5 is a detail cross-sectional view of a reinforcing ring utilized in the invention actuator;

FIG. 6 is a detail cross-sectional view of a dust shield utilized in the invention actuator; and FIG. 7 is a detail cross-sectional view of an elastomeric seal utilized in the invention actuator.

DETAILED DESCRIPTION OF THE PREFERRED EMBODIMENT

The invention hydraulic actuator 10 seen in FIGS. 1 and 2 is intended for use with a motor vehicle of the type including a transmission housing 12, a clutch bell housing 14, a transmission input shaft 16 drivingly interconnecting the vehicle clutch and the vehicle transmission, and a plurality of diaphragm spring fingers 18 acting in known manner to engage and disengage the clutch in response to operation of hydraulic actuator 10.

Actuator 10 is positioned within clutch bell housing 14 in concentric surround to input shaft 16 and is secured to transmission housing 12.

Actuator 10 includes a housing 20, an annular piston 22, a bearing assembly 24, and a preload spring 26.

Housing 20 is formed of a suitable plastic material such for example as a glass reinforced Nylon material and includes a rearward mounting section 20a adapted to be postioned against the front face 12a of transmission housing 12, a central annular forwardly extending quill shaft section 20b defining an inner bore 20c extending centrally through the housing and sized to loosely pass input shaft 16, an annular inner piston wall section 20d extending forwardly from mounting section 20a in concentric, radially outwardly spaced relation to quill shaft 20b to define an annular intermediate bore 20e therebetween open at its forward end and closed at its rearward end by an annular shoulder 20f interconnecting piston wall section 20d and the rear end of quill shaft section 20b, and an annular outer piston wall section 20g extending forwardly from mounting section 20a in concentric, radially outwardly spaced relation to inner piston wall section 20d to define an annular, outer piston bore 20h therebetween closed at its rearward end by mounting section 20a and open at its forward end. Housing 20 is mounted on the front face 12a of transmission housing 12 by piloting the counterbore 20i defined by shoulder 20f on inner piston wall section 20d over an annular central hub portion 12b extending forwardly from the front face of the transmission housing.

Housing 20 further includes integrally formed fittings 20j and 20k connected in known manner to conduits 27 and 28 connected respectively to the discharge fitting of the associated master cylinder 29 and to a suitable vent device 30. Conduits 27 and 28 respectively communicate via fittings 20j and 20k with the rear end of piston bore 20h via passages 20l and 20m defined respectively by fittings 20j and 20k. An eyelet 20n positioned between fittings 20j and 20k and formed integrally with the fittings provides a central aperture 20p for passage of a suitable threaded fastener (not shown) for engagement with a threaded bore in the front face of the transmission housing 12 to positively fasten housing 20 to the front face of the transmission housing.

Piston 22 is formed of a suitable plastic material such as glass reinforced Nylon and has an annular configuration sized to be slidably received within piston bore 20h. Specifically, annular piston 22 is received at its rear end in piston bore 20h and projects at its forward end out of the piston bore, and an annular seal 34 is positioned in bore 20g adjacent the rear end of piston 22 to preclude hydraulic fluid leakage. Piston 22 as seen in FIG. 2 in its extreme extended position corresponding to disengagement of the clutch.

Bearing assembly 24 includes a bearing carrier 36 and a bearing assembly 38. Bearing carrier 36 is formed of a suitable plastic material and includes a hub portion 36a slidably received on the outer periphery of quill housing portion 20b and slidable in known manner axially along quill section 20b in response to operation of the actuator. Hub portion 36a is precluded from rotation relative to quill shaft section 20b by internal axially extending ribs 36b guiding in external axially extending grooves 20q in quill shaft section 20b. The bearing carrier is seen in FIG. 2 in its extreme extending position corresponding to disengagement of the clutch with the extreme forward position defined and delimited by a snap ring 40 carried at the free forward end of quill shaft section 20b. For purposes of design stability, hub portion 36a preferably has an axial length at least equal to the outer diameter of quill shaft section 20b.

Bearing assembly 38 includes a rearward housing member 42, a forward housing member 44, an outer race 46, an inner race 48, a plurality of ball bearings 50, and a seal 52.

Ring bearing housing 42 has a generally Z configuration in cross section and includes an inner hub portion 42a integrally molded into the outer periphery of bearing carrier hub portion 36a at a location intermediate the axial length of the hub portion, a radially outwardly extending annular flange portion 42b, and an outer axially forwardly extending flange portion 42c.

Forward housing 44 includes a hub portion 44a positioned in concentrically spaced relation around bearing carrier hub portion 36a and a radially outwardly extending flange portion 44b bearing in known manner against diaphragm spring fingers 18. Outer race 46 is fixedly secured to housing 42 and is non-rotatable and inner race 48 is fixedly secured to housing 44 and is rotatable in known manner during engagement of the clutch. Seal 52 functions to preclude the entry of contaminants into the bearing.

Spring 26 is formed of steel and has a conical, coil configuration. The rear end of spring 26 is positioned in annular bore 20e and the front end of spring 26 bears against the rear face of radial flange portion 42b of bearing housing 42 so as to function to constantly preload the bearing and maintain the bearing assembly in a condition such that the flange portion 44b of the front bearing housing 44 is constantly and resiliently pressed against spring diaphragm fingers 18. The distance between the inner diameter of piston bore 20h and the outer diameter of quill shaft section 20d is substantially greater than the radial thickness of bearing carrier hub portion 36a so that piston 22 and bearing carrier hub portion 36a may be disposed in axially overlapping relationship so as to contribute to the axial compactness of the actuator. Further, in the engaged position of the clutch, the rear portion 36c of the bearing carrier hub portion 36a may retract into the undercut annular bore 20e so as to further facilitate the axial compactness of the invention actuator. The distance between the outer diameter quill shaft section 20b and the inner diameter of piston bore 20h is also sufficient to allow spring 26 to be positioned between the bearing carrier hub portion and the piston 22 so as to provide a convenient and protected environment for the spring and so as to enable the spring to act against the rear face of the bearing assembly to conveniently and efficiently provide a preload for the bearing assembly.

A roller bearing and seal assembly 54 is position within transmission housing hub portion 12b so as to provide sealing and bearing support for shaft 16 in known manner.

The invention hydraulic actuator further includes a reinforcing ring 56 and a dust shield 58.

Ring 56 is formed of a suitable metallic material, such for example as steel or aluminum, and including a continuous uninterrupted circumferential external groove 56a, positioned substantially mid-way between the rear annular edge 56b of the ring and the front annular edge 56c of the ring, and a series of circumferentially spaced and circumferentially extending slots 56d positioned between groove 56a and the rear annular edge 56b of the ring and extending radially through the ring from the inner circumferential ring surface 56e to the outer circumferential ring surface 56f.

Ring 56 has a radial thickness constituting a major fraction of the radial thickness of the outer annular wall section 20g of housing 20 and is formed with the housing 20 in an insert molding process in which the ring is injection molded integrally with and onto the housing outer wall section 20g with the outer peripheral surface 56f of the ring substantially flush with the outer peripheral surface of housing wall section 20g and the forward annular edge 56c of the ring substantially flush with the forward annular edge 20r of the housing. Ring 56 is secured to the housing by the molding adherence between the inner periphery of the ring and the adjacent circumferential surface of the housing wall section 20g as well as by the interlocking engagement of plastic material of the housing which flows into the slots 56d in the injection molding process to form a positive interlocking structure as between the ring and the housing. It will be apparent that metal ring 56 forms a tight hoop around the outer wall section of the slave cylinder housing adjacent the forward or open end of the piston bore 20h so as to delimit radially outward movement of the piston wall section 20g in response to the hydraulic fluid pressure generated within the bore 20h during the operation of the hydraulic actuator.

Dust shield 58 is formed of a suitable sheet metal material such as spring steel and includes an axially extending main body portion 58a and a radially inwardly extending lip portion 58b adjacent the forward end of the shield. A series of circumferentially spaced prongs 58c are struck from main body portion 58a and extend radially inwardly and forwardly with respect to the main body of the shield to provide a plurality of spring fingers. Shield 58 is sized to fit snugly telescopically over the forward end of the slave cylinder housing and, specifically, over the ring 56. As the shield is fitted telescopically over the forward end of the slave cylinder housing and over the ring 56, the spring fingers 58c yield radially outwardly to allow the passage of the shield over the ring 56 and then snap radially into locking engagement with the groove 56a as the shield reaches its desired mounting position on the ring 56 in which the rearward edge of the shield is generally adjacent the rearward edge of the ring 56 and the forward lip portion 58b of the shield is disposed axially forwardly of the forward end of the ring. An elastomeric seal 60 is secured to the free annular edge 58d of lip portion 58c with an external annular groove 60a of the seal fitted over the edge 58d of the lip portion. In the assembled relation of the parts, the radially inner circumferential edge of the elastomeric member 60 wipingly and sealingly engages the outer periphery of piston 22 so as to preclude the entry of dust or other contaminants into the piston bore.

Master cylinder 29, conduit 27 and actuator 10 are prefilled with hydraulic fluid and delivered to the motor vehicle manufacturer as a prefilled assembly for installation on the motor vehicle during the vehicle assembly process.

In the operation of the invention hydraulic actuator, hydraulic fluid is delivered through line 27 is known manner from the associated master cylinder 29 in response to depression of the associated clutch pedal 52 of the motor vehicle to move annular piston 22 axially relative to the housing of the actuator. The piston is seen in FIG. 2 in its extreme extended position corresponding to disengagement of the clutch. In the clutch engaged disposition of actuator 10, piston 22 is retracted rearwardly within piston bore 20h and the rear portion 36c of bearing carrier hub portion 36a is positioned within the undercut bore 20e provided between piston bore 20h and quill shaft section 20b so as to facilitate the axially nested relationship of the bearing carrier and the piston and enable the provision of a hydraulic actuator having a relatively short axial dimension for installation applications in which the axial dimension is critical.

During the operation of the invention hydraulic actuator, the ring 56 acts as a rigid hoop member to preclude radially outward movement of the outer wall section 20g of the slave cylinder housing in response to the high pressures generated in the bore 20h during the operation of the actuator. Ring 56 thus acts to counteract the tendency of the outer wall section of the housing to move outwardly in cantilevered fashion during the operation of the actuator with resultant loss of adequate sealing as between the piston 22 and the cylinder and with ultimate fatiguing and failure of the outer wall of the cylinder due to the stresses developed adjacent the free outer end of the piston bore during the actuation of the cylinder. The ring 56 further serves as a convenient and effective mounting member for the dust shield 58 so as to enable the provision of an inexpensive and effective means of precluding the entry of dust or other contaminants into the piston bore 20h.

The invention will be seen to provide a hydraulic actuator for use in engaging and disengaging the clutch of a motor vehicle in which the axial dimension of the actuator has been minimized without in any way sacrificing the effectiveness and the performance of the actuator; in which loss of sealing and ultimate failure of the actuator housing have been eliminated in a simple and effective manner; and in which an effective dust and contaminate seal has been provided in a simple and effective manner.

Whereas a preferred embodiment of the invention have been illustrated and described in detail it will be apparent that various changes may be made in the disclosed embodiment without departing from the scope or spirit of the invention.

We claim:
1. A hydraulic actuator for use with a clutch having a clutch housing and an axially extending drive shaft mounted for rotation within the clutch housing, said actuator including:
 (A) an annular housing adapted to be positioned within the clutch housing concentrically around the drive shaft, formed of a plastic material, and including inner and outer axially extending annular wall portions forming an annular axially extending blind piston bore having an open end and a closed end;
 (B) an annular piston positioned at one end in said piston bore and extending at its other end out of said piston bore;
 (C) a metal ring molded into the outer periphery of said outer annular wall portion.

2. A hydraulic actuator according to claim 1 wherein:
 (D) said ring is positioned around said outer annular wall portion adjacent the open end of said bore.

3. A hydraulic actuator for use with a clutch having a clutch housing and an axially extending drive shaft mounted for rotation within the clutch housing, said actuator including:
 (A) an annular housing adapted to be positioned within the clutch housing concentrically around the drive shaft, formed of a plastic material, and including inner and outer axially extending annular wall portions forming an annular axially extending blind piston bore having an open end and a closed end;
 (B) an annular piston positioned at one end in said piston bore and extending at its other end out of said piston bore;
 (C) a metal ring insert molded into the outer periphery of said outer annular wall portion; and
 (D) an annular dust shield secured proximate one axial end thereof to said ring and sealingly engaging at its other end with said piston.

4. A hydraulic actuator according to claim 3 wherein:
 (F) said ring includes a radially outwardly opening groove extending circumferentially around the outer periphery of said ring; and
 (G) said dust shield includes an axially extending main body portion including circumferentially spaced prong portions received in said groove.

5. A hydraulic actuator according to claim 4 wherein:
 (H) said main body portion of said dust shield further includes a radially inwardly extending lip portion adjacent said other end of said dust shield; and
 (I) said dust shield further includes an annular elastomeric member secured to the free annular edge of said lip portion and sealingly engaging said piston.

6. In a hydraulic actuator for use with a clutch having a clutch housing and an axially extending drive shaft mounted for rotation within the clutch housing and including an annular housing adapted to be positioned within the clutch housing in concentric surrounding relation to the drive shaft and including an inner and outer axially extending blind piston bore having an open end and a closed end in the piston bore and extending at its other end out of the piston bore; the improvement wherein:
 (A) said annular housing is formed of a plastic material; and
 (B) a metal ring is molded into the outer periphery of said outer annular wall portion of said housing to delimit radially outward expansion of said outer annular wall portion.

7. A hydraulic actuator for use with a clutch having a clutch housing and a transmission input shaft mounted for rotation within the clutch housing, said actuator including:
 (A) a plastic housing structure adapted to be positioned within the clutch housing concentrically around the transmission input shaft and defining a rearward mounting section, a quill shaft extending forwardly from said rearward mounting section in concentrically surround relation to the input shaft, and an annular piston bore defined by concentric inner and outer annular housing walls and having an open forward end and an inner diameter greater than the outer diameter of said quill shaft by a predetermined radial distance;
 (B) an annular piston having its rear end positioned in said piston bore and extending at its forward end out of said piston bore; and
 (C) a bearing assembly including a bearing carrier having a hub portion slidably mounted on said quill shaft and having a maximum radial thickness less than said predetermined radial distance so that said hub portion may be disposed concentrically within said annular piston; and
 (D) a metal ring positioned in tightly surrounding relation to said outer annular housing wall.

8. A hydraulic actuator for use with a clutch having a clutch housing and a transmission input shaft mounted for rotation within the clutch housing, said actuator including:
 (A) a housing structure adapted to be positioned within the clutch housing concentrically around the transmission input shaft and defining a rearward mounting section, a quill shaft extending forwardly from said rearward mounting section in concentrically surrounding relation to the input shaft, and an annular piston bore having an open forward end and an inner diameter greater than the outer diameter of said quill shaft by a predetermined radial distance;
 (B) an annular piston having its rear end positioned in said piston bore and extending at its forward end out of said piston bore;
 (C) a bearing assembly including a bearing carrier having a hub portion slidably mounted on said quill shaft and having a radial thickness less than said predetermined radial distance so that said hub portion may assume an axially overlapping relation to said annular piston; and
 (D) coacting rib and groove means on said housing structure quill shaft and on said bearing carrier hub portion to preclude rotation of said bearing carrier relative to said quill shaft.

9. A hydraulic actuator according to claim 8 wherein said rib means are provided on said bearing carrier and said groove means are provided on said quill shaft.

10. A hydraulic actuator for use with a clutch having a clutch housing and an axially extending drive shaft mounted for rotation within the clutch housing, said actuator including:
 (A) an annular housing adapted to be positioned within the clutch housing concentrically around the drive shaft, formed of a plastic material, and including inner and outer axially extending annular wall portions forming an annular axially extending blind piston bore having an open end and a closed end;

(B) an annular piston positioned at one end in said piston bore and extending at its other end out of said piston bore; and (C) a metal ring positioned in tightly surrounding relation to said outer annular wall portion;

(D) said housing including an annular quill shaft portion adapted to be positioned concentrically around the drive shaft;

(E) said actuator further including a bearing assembly including an annular bearing carrier slidably mounted on said quill shaft portion; and (F) said coating rib and groove means being provided on said quill shaft portion and on said bearing carrier to preclude rotation of said bearing carrier relative to said quill shaft portion.

11. A hydraulic actuator according to claim 10 wherein said rib means are provided on said bearing carrier and said groove means are provided on said quill shaft portion.

* * * * *